INVENTOR.
LEIF K. LOHN,

June 21, 1949.                L. K. LOHN                    2,473,655
                        COMBINE PLATFORM CONTROL
Filed Jan. 2, 1948                                    2 Sheets-Sheet 2
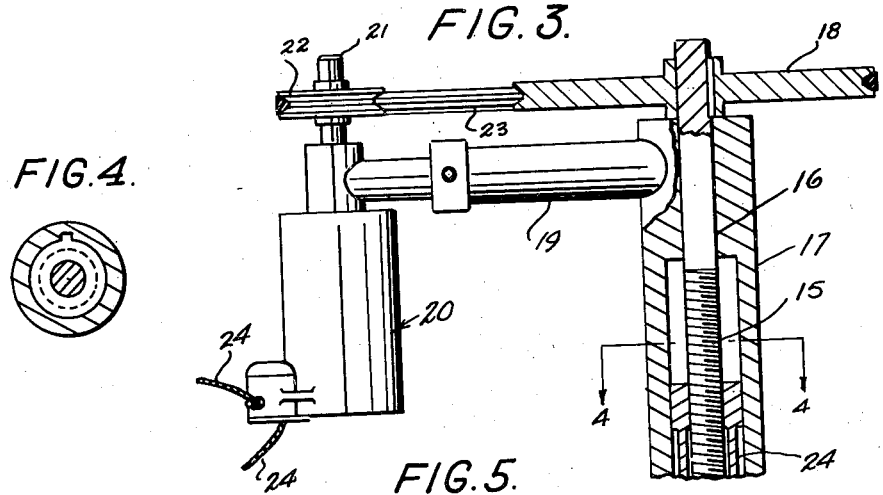
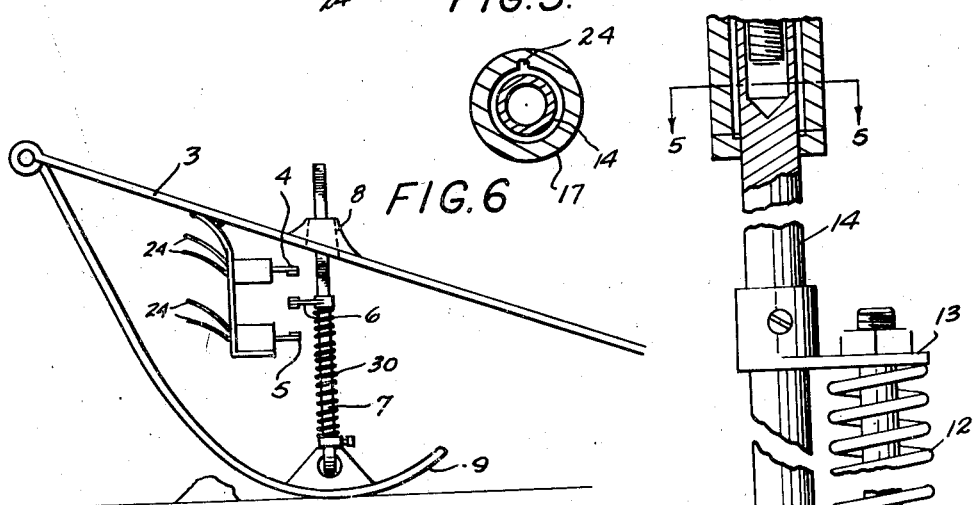
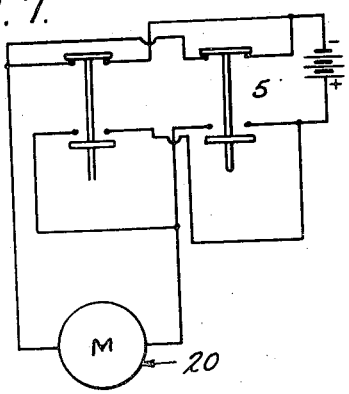
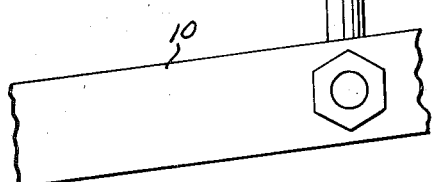
INVENTOR.
LEIF K. LOHN,
BY
McMorrow, Berman & Davidson
ATTORNEYS.

Patented June 21, 1949

2,473,655

UNITED STATES PATENT OFFICE 2,473,655

COMBINE PLATFORM CONTROL

Leif K. Lohn, Norwich, N. Dak.

Application January 2, 1948, Serial No. 12

2 Claims. (Cl. 56—214)

1

The present invention is directed to improvements in a device for raising and lowering the conventional sickle bar and reel of a harvesting combine.

The primary object of the invention is to provide a device of this nature so constructed that when an obstruction is encountered during travel of the combine over an evenly leveled surface the conventional grain pan, sickle bar and reel will be elevated to prevent injury thereto, and further to permit the previously elevated elements to return to their ground engaging position after passing over the obstruction.

Another object of the invention is to provide a ground engaging shoe operable to control an electric motor to reverse the rotative movement thereof to alternately raise the grain pan, sickle bar and reel.

With these and other objects in view, this invention resides in the novel features of construction, formation, combination and arrangement of parts to be hereinafter more fully described, claimed and illustrated in the accompanying drawings, in which:

Figure 3 is a side view, partly in section of the raising and lowering unit.

Figure 4 is a sectional view on line 4—4 of Figure 3.

Figure 5 is a sectional view on line 5—5 of Figure 3.

Figure 6 is a detail view of the circuit controlling shoe.

Figure 7 is a diagram of the circuit control.

Figure 1:
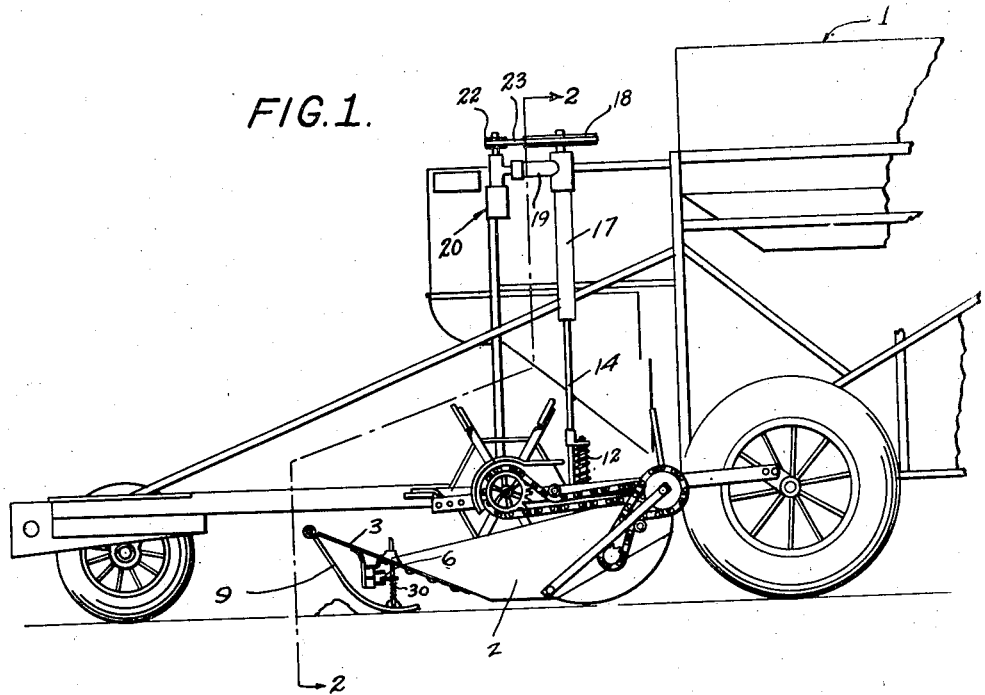
Figure 1 is a side elevation of a conventional combine equipped with the device.
Figure 2:
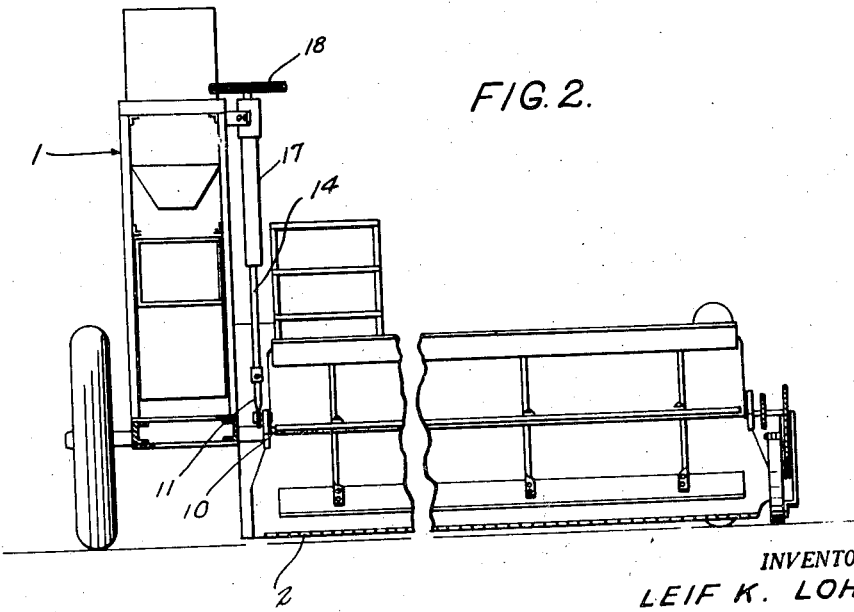
Figure 2 is a front view thereof.

Referring to the drawings, 1 designates generally a conventional type of combine and to the grain pan 2 of which is secured a bar 3. Contacts 4 and 5 depend from bar 3 in vertically-spaced relation to each other. Movable between said contacts is a contact finger 6 connected to the upper end of a shock absorbing coil spring 30 which is concentrically disposed about the lower part of a rod 7. Rod 7 above the finger 6 is slidable in a guide 8 formed in bar 3 and its lower end is pivotally connected to an arcuate ground engaging shoe 9, as clearly shown in Figure 6.

To a bar 10 of the grain pan 2 is pivotally connected the lower end of a rod 11, which is encircled by a coil shock absorbing spring 12 said spring being mounted between brackets 13—13 connected with the lower end of a rod 14 and in which is threaded a screw shaft 15, said shaft being rotatable in a bearing 16 of the sleeve 17,

2 and to the upper end of the shaft 16 is fixed a grooved pulley 18, the purpose of which will later appear.

A bracket 19 is supported by the sleeve 17 and supports a motor assembly 20 of a conventional type which serves to rotate a shaft 21 reversely, and on this shaft is a grooved pulley 22. Trained around the pulleys 18 and 22 is a belt 23.

The rod 14 is keyed, as at 25, to prevent rotation thereof in the sleeve 17, but permitting free sliding vertical movement therein.

Conductors 24 lead from the motor unit 20 to the contacts 4 and 5 which are alternately engaged by the finger 6 rotate the shaft 16 reversely in order to raise and lower the rod 14, and thus the bar 10 of the grain pan 2. If desired the rod 11 may be fixed to any suitable part of the conventional combine platform.

Briefly the operation is as follows:

As the combine 1 is moved across a field the shoe 9 will lightly contact the ground and when encountering an obstruction, such as a rock or clod, the motor unit 20 will rotate the shaft 15 due to its threaded engagement in the sleeve 14, the grain pan will be elevated, and with it the sickle bar to prevent injury thereto. The sickle bar, grain pan and reel are as usual carried by a platform.

Obviously the contacts are alternately engaged by the finger 6 in order that the shaft 15 will be rotated in one direction by the pulley 18 to move the sleeve upwardly and in a reverse direction to move the shaft 14 downwardly, and in this manner the shoe 9 is raised and lowered.

What is claimed is:

1. In a combine having a vertically-adjustable platform, the combination with a reversible electric motor operatively connected to said platform for raising and lowering the same, of a bar fixed to said platform and extending forwardly thereof in vertically-spaced relation to the ground, a shoe hinged to said bar and extending downwardly and rearwardly into engagement with the ground, said bar being formed with a substantially-vertically-disposed guide in overlying relation to said shoe, a rod pivoted to said shoe and vertically slidable in said guide, vertically-spaced fixed upper and lower contacts depending from said bar in proximity to said rod, a movable contact carried by said rod between said fixed contacts, said movable contact engaging said upper fixed contact upon upward movement of said shoe and rod relative to said bar, said fixed contact engaging the lower fixed contact upon downward movement of said shoe and rod relative to said bar, and circuit means operatively connecting all of said contacts to said motor whereby to drive said motor in opposite directions upon engagement of said movable contact with said upper and lower fixed contacts so as to raise and lower said platform automatically in conformance with vertical movement of said shoe.

2. In a combine having a vertically-adjustable platform, the combination with a reversible electric motor operatively connected to said platform for raising and lowering the same, of a bar fixed to said platform and extending forwardly thereof in vertically-spaced relation to the ground, a shoe hinged to said bar and extending downwardly and rearwardly into engagement with the ground, said bar being formed with a substantially-vertically-disposed guide in overlying relation to said shoe, a rod pivoted to said shoe and vertically slidable in said guide, vertically-spaced fixed upper and lower contacts depending from said bar in proximity to said rod, a coil spring surrounding said rod, a movable contact carried by said spring, said movable contact extending outwardly of said spring between said fixed contacts, said movable contact yieldably engaging said fixed contacts upon vertical movement in opposite directions of said shoe and rod relative to said bar, and circuit means operatively connecting all of said contacts to said motor whereby to drive said motor in opposite directions upon engagement of said movable contact with said upper and lower fixed contacts so as to raise and lower said platform automatically in conformance with vertical movement of said shoe.

LEIF K. LOHN.

REFERENCES CITED

The following references are of record in the file of this patent:

UNITED STATES PATENTS

| Number | Name | Date |
|---|---|---|
| 1,303,798 | Janes | May 13, 1919 |
| 1,519,198 | Franke | Dec. 16, 1924 |
| 1,570,415 | Sumbulian | Jan. 19, 1926 |
| 1,574,691 | Ragsdale | Feb. 23, 1926 |
| 2,177,803 | Ferte et al. | Oct. 31, 1939 |
| 2,320,953 | Shenstone | June 1, 1943 |
| 2,368,219 | Heath | Jan. 30, 1945 |
| 2,420,219 | Baldwin | May 6, 1947 |